United States Patent [19]

Chowdhury et al.

[11] Patent Number: 4,572,105
[45] Date of Patent: Feb. 25, 1986

[54] BACKFLUSHING SYSTEM

[75] Inventors: Mofazzal H. Chowdhury; Michael W. Ellis, both of Kansas City, Mo.

[73] Assignee: Alfa-Laval, Inc., Fort Lee, N.J.

[21] Appl. No.: 652,517

[22] Filed: Sep. 20, 1984

[51] Int. Cl.$^4$ ............................................. A01J 7/00
[52] U.S. Cl. ................................................ 119/14.18
[58] Field of Search ............... 119/14.08, 14.14, 14.18

[56] References Cited

U.S. PATENT DOCUMENTS

| | | | |
|---|---|---|---|
| 2,650,179 | 8/1953 | Anderson | 134/22 |
| 2,680,445 | 6/1954 | Hemminger | 134/58 |
| 2,787,445 | 3/1957 | Golay | 119/14.07 |
| 3,111,112 | 11/1963 | Fjermestad | 119/14.07 |
| 3,119,400 | 1/1964 | Bihler | 134/57 |
| 3,191,576 | 6/1965 | Bender | 119/14.07 |
| 3,417,663 | 12/1968 | Fjermestad et al. | 134/58 |
| 3,500,839 | 3/1970 | Bender | 134/57 |
| 3,506,034 | 4/1970 | Branton | 119/14.18 X |
| 4,175,514 | 11/1979 | Souza et al. | 119/14.18 X |
| 4,222,346 | 9/1980 | Reisgies | 119/14.18 |
| 4,462,425 | 7/1984 | Mehus | 119/14.18 X |

*Primary Examiner*—Robert P. Swiatek
*Attorney, Agent, or Firm*—Davis, Hoxie, Faithfull & Hapgood

[57] ABSTRACT

A system for backflushing milking machinery comprises a backflush valve for alternatively connecting one or a plurality of milking units to a wash line or to a vacuum milk line. When the milking units are connected to the wash line, a manifold valve operated by high pressure air under automatic control, sends water, sanitizing fluid and air sequentially through the milking units. Provision is made for sending bursts of air through the water and sanitizing liquid as they are furnished to the milk units. Provision is also made for flushing the back-flush valve with water after a washing cycle to prevent entry of washing fluids into the milk line.

9 Claims, 7 Drawing Figures

BACKFLUSHING SYSTEM

This invention relates to a system for "backflushing" or washing automatic milking machinery.

In modern systems for automatically milking cows and other dairy animals, it is desirable to wash and sensitize the milking elements, particularly the teat cup and milking claw, after each milking. Failure to properly wash the milking elements after each milking increases the chances of developing and spreading mastitis.

In Brown U.S. Pat. No. 4,168,677, a system is disclosed in which water and sanitizing solutions are serially fed through a three way valve to a milk claw for backflushing. The Brown system leaves something to be desired, however, in that it is not readily expanded to multi-unit operation and that the valve design tends to cause contamination of the milk by the cleaning liquids after milking has resumed.

It is an object of the present invention to provide a backwashing system which can be used with a single milking unit or with a plurality of such units in parallel.

It is another object of the invention to provide a backflushing system including means to flush the valve furnishing sanitizing fluid to the milking units, enabling contamination of the milk to be more easily avoided.

It is another object of the invention to provide means for enhancing the turbulence and hence the cleansing power of the backflushing liquids.

It is another object of the invention to provide separate pneumatic systems for operation of valves and for furnishing air to the cleaning and sanitizing liquids.

These and other objects are achieved in accordance with the invention by means of a backflush system comprising a backflush valve for alternately connecting a milking unit to the milk line and to a wash line, a source of high pressure air, a source of low pressure air, a source of water, a source of sanitizing fluid, a manifold valve for connecting said source of low pressure air, said source of water and said source of sanitizing fluid to said wash line at predetermined intervals and means connected to said high pressure air line for operating said manifold valve.

In accordance with a further feature of the invention, there is provided a means for furnishing bursts of low pressure air to the wash line whilst the wash line is connected to the source of water and the source of sanitizing fluid to promote turbulence and hence enhance the scouring action of the water or sanitizing fluid.

In accordance with a further feature of the invention means are provided to deliver a stream of water to the backflush valve after the principal backflushing operations have been completed, to flush any remaining washing fluid from the valve structure and thus suppress contamination of the milk on the next milking cycle.

The invention will be further described with reference to the accompanying drawings in which.

Figure 1:
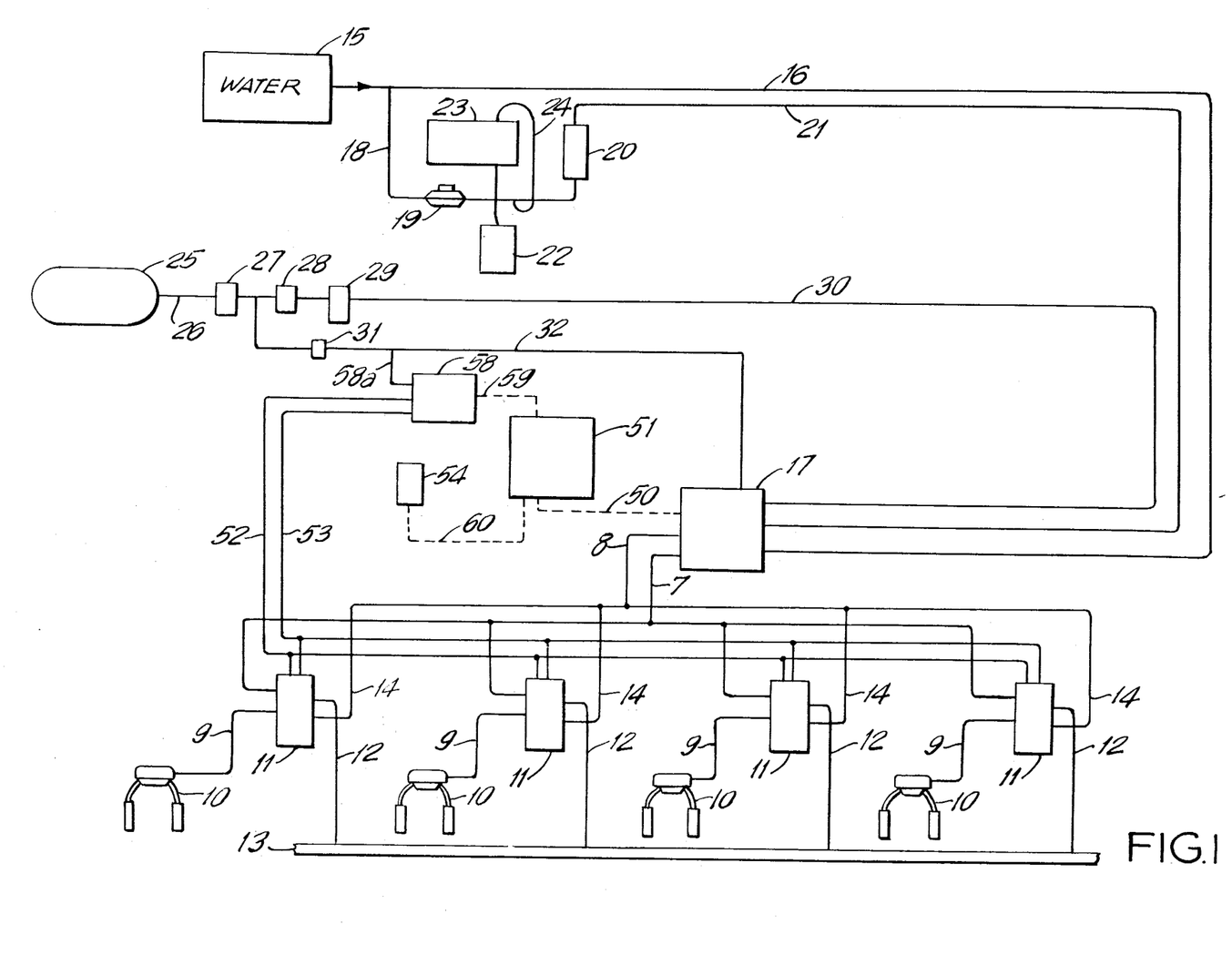
FIG. 1 is a schematic representation of a system according to the invention.

Referring to FIG. 1, the invention is shown applied to an automatic milking installation having four milking units, i.e., four positions at which cows can be milked simultaneously. Obviously any number of positions can be used. Some modern milking parlors have as many as twenty positions; i.e., twenty cows (or other animals) can be milked simultaneously. At each milking position there is a milk claw 10 connected, via a line 9, to a backflush valve 11. During milking, each backflush valve 11 connects line 9 and the claw 10 to a line 12 which connects to a milk line 13, which is under vacuum. When milking is finished the valve 11 switches the line 9 from its connection with line 12 to connection with a wash line 14.

The valve 11 is preferably constructed according to our copending application Ser. No. 538,440 filed Oct. 3, 1983. A simplified drawing of one species of that valve is shown in FIG. 4.

Figure 4:
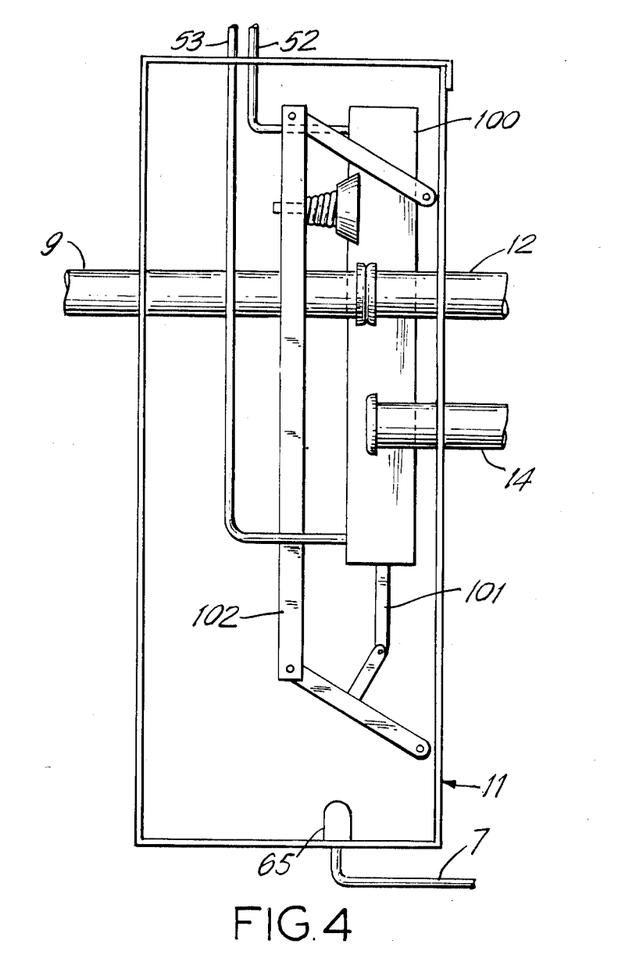
FIG. 4 is a simplified view in elevation of a backflush valve for use in the invention.

As shown in FIG. 4, the valve is in the milking position with milk from the cow being delivered from line 9 to line 12. When milking is completed, compressed air introduced through line 52 into cylinder 100 moves piston 101 downwardly swinging beam 102 and moving line 9 from its connection with milk line 12 into connection with wash line 14.

From the wash line 14, the lines 9 and the milk claws 10 (FIG. 1) are consecutively flushed with water and sanitizing fluid. To accomplish this there is provided a source of water 15, which may be a municipal tap or any other source of potable water. Through a line 16 the water is led to a manifold valve 17. A line 18, branching from line 16, leads through flowmeter 19 to a mixing chamber 20 which is also connected via line 21 to the manifold valve 17. A sanitizing concentrate, for example, an iodine concentrate, is drawn from a tank 22 by a pump 23, and delivered via lines 24 and 18 to the mixing chamber 20 where it is mixed with water to use concentration and furnished to manifold valve 17 as a sanitizing solution, through line 21.

Compressed air is provided from a tank 25 which may be connected to a compresser (not shown). The air is at relatively high pressure, above say 60 to 80 psig. It is passed via line 26 to a filter 27 for removal of liquid and particulate matter and is then divided into two streams. One stream is delivered to a pressure regulator 28 where its pressure is reduced to say 5 to 20 psig. It is then again filtered in filter 29 and delivered via line 30 to the manifold valve 17. This air is intended for use in cleaning and sanitizing the milking units, as described below.

The second air stream is sent from filter 27 to a regulator 31 where its pressure is reduced to 60 to 80 psig. It is sent to the manifold valve 17 via line 32 and also to a solenoid controlled four-way valve 58. It provides the operating medium for various pneumatic devices in the system.

The purpose of manifold valve 17 is to control the flow of water, sanitizing fluid and air to the backflush valves 11 and through them, to the milking claws 10. The precise structure of the valve 17 may vary as convenient and is not a part of this invention. A suitable design is shown schematically in FIG. 2.

Figure 2:
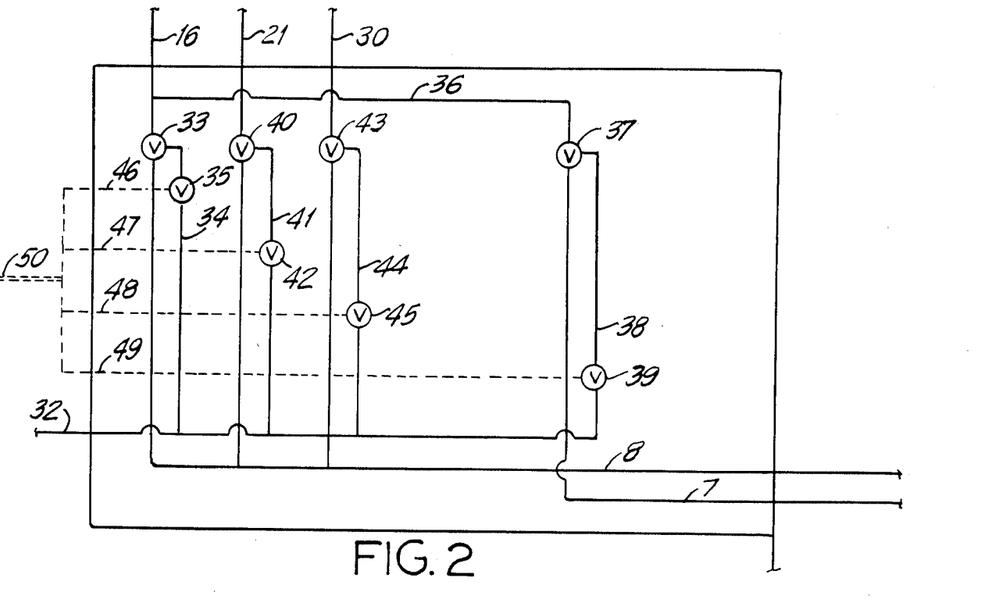
FIG. 2 is a schematic representation of a manifold valve for use in a system according to the invention.

As shown in FIG. 2, the water line 16 enters the manifold valve 17 and is directed to a line 8 through a valve 33 operated by high pressure air furnished through lines 32 and 34 through a solenoid operated valve 35. A line 36 branching from line 16 also carries water to a line 7 through a valve 37 operated by high pressure air furnished from line 32 via line 38 and solenoid operated valve 39.

Sanitizing fluid from line 21 is directed to line 8 through a valve 40 operated by high pressure air furnished through lines 32 and 41 through a solenoid operated valve 42.

Air (low pressure) from line 30 is directed to line 8 through a valve 43 via lines 32 and 44 through a solenoid operated valve 45.

The solenoid operated control valves 35, 42, 45, 39 are operated in response to electrical signals transmitted via lines 46, 47, 48, 49, respectively. These lines, indicated collectively as a conduit 50 in FIG. 1, lead to an electronic control unit 51.

Figure 5:
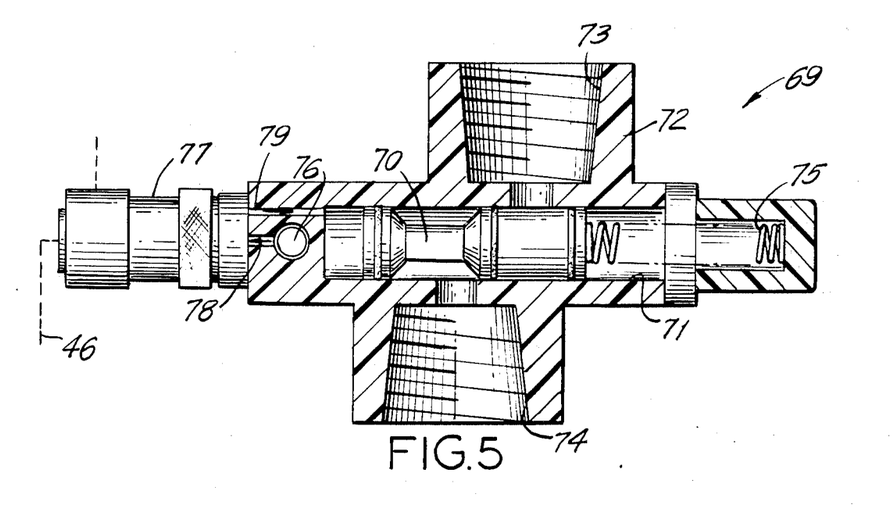
FIG. 5 is an view, partially in elevation and partly in vertical section of a valve component for use in manifold valve in a system according to the invention.

A suitable mechanical structure for the manifold valve components shown schematically in FIG. 2, is shown in FIG. 5. Referring to FIG. 5, the valve 69 which corresponds to a combination of valves 33 and 35 in FIG. 2, comprises a spool 70, slidable in a cylindrical chamber 71 in a casing 72. An inlet 73 and an outlet 74 are provided on opposite sides of the casing 72, offset from one another but connecting with chamber 71. As shown, the spool is displaced to the left and prevents communication between the inlet and the outlet. It is held in that position by spring 75.

High pressure air is furnished (as from line 32 in FIG. 2) through port 76 and flows through a solenoid control valve 77 (corresponding to 35 in FIG. 2) through channel 78 and, when said valve 77 is opened as by a signal through line 46, back through channel 79 to the left hand side of chamber 71. Thus when solenoid control valve 77 is open, air under pressure is admitted to the left end of passage 71 and forces spool 70 to the right, connecting the inlet 73 with outlet 74 and enabling air, water or sanitizing solution, as the case may be, to be furnished to the backflush valve 11.

As shown schematically in FIG. 2, and as described above, four valves such as 69 may be arranged side by side and operated sequentially except for that handling the air, which may be used to furnish air bursts during the water and sanitizing solution intervals, as described above.

The function of the electronic control unit 51 is (a) to provide electrical signals to a control valve 58 which in turn controls the delivery of pneumatic signals via lines 52 and 53 to operate backflush valve 11 to connect the lines 9 either to the milk line 13 or to the wash lines 14; and (b) to provide electrical signals via electrical conduit 50 to manifold valve 17 during the backflushing cycle, to operate valves 35, 42, 45, 39 to cause the appropriate fluids to be furnished to lines 7 and 8. The circuitry of the unit 51 is not a part of this invention. Given the performance requirements detailed below, such units are readily constructed.

Figure 3:
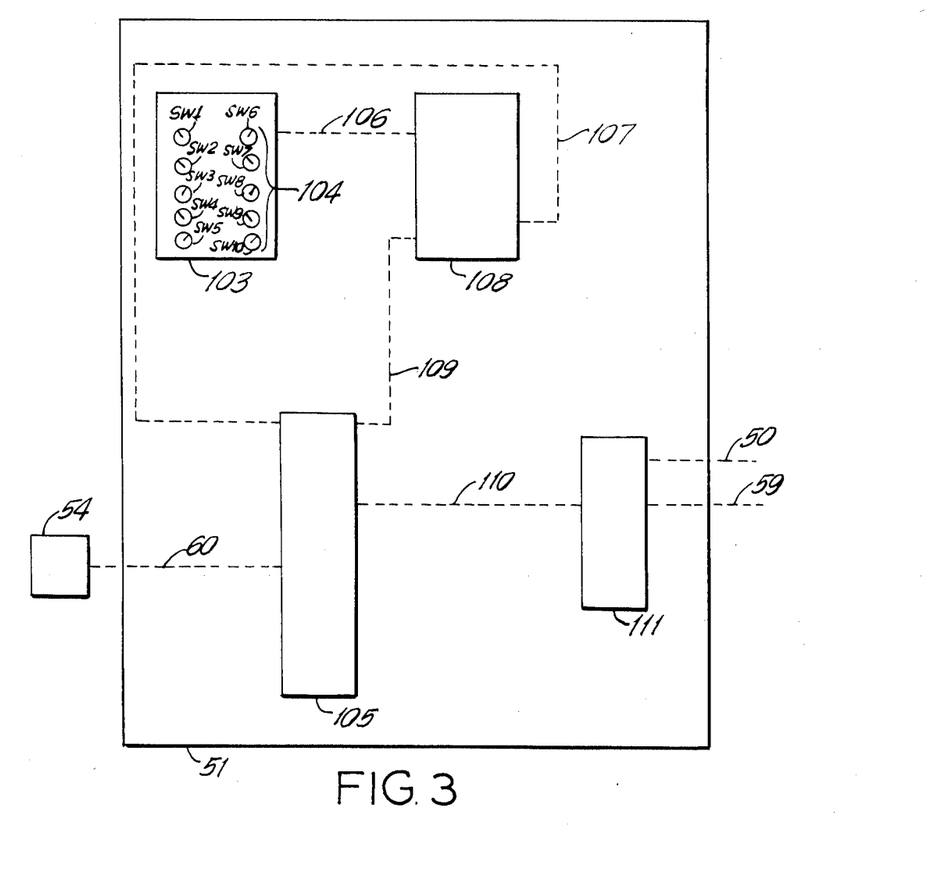
FIG. 3 is a block diagram of a control unit for use in the system according to the invention.
Figure 6A:
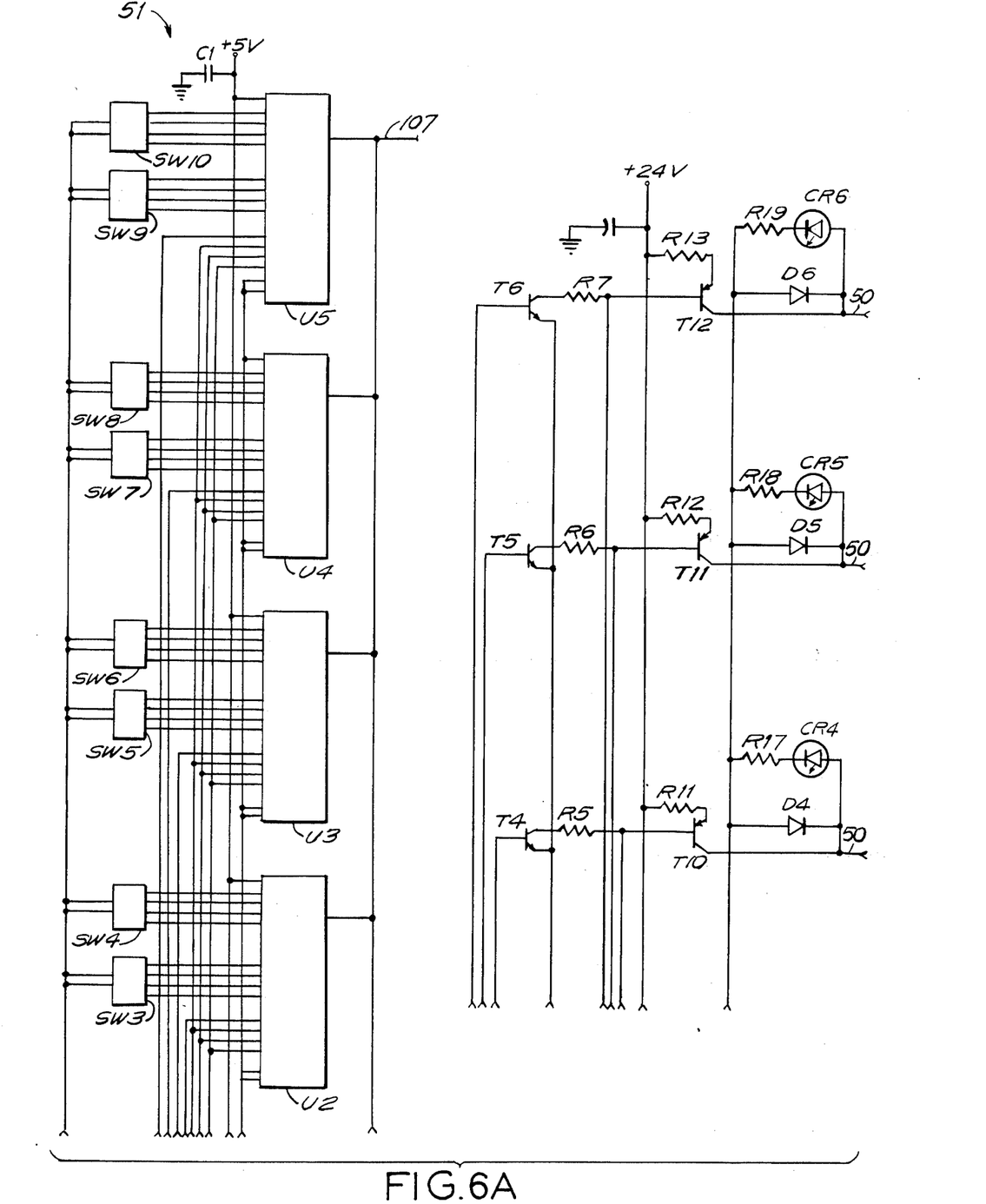
FIGS. 6A and 6B are a detailed schematic diagram of the control unit of FIG. 3.
Figure 6B:
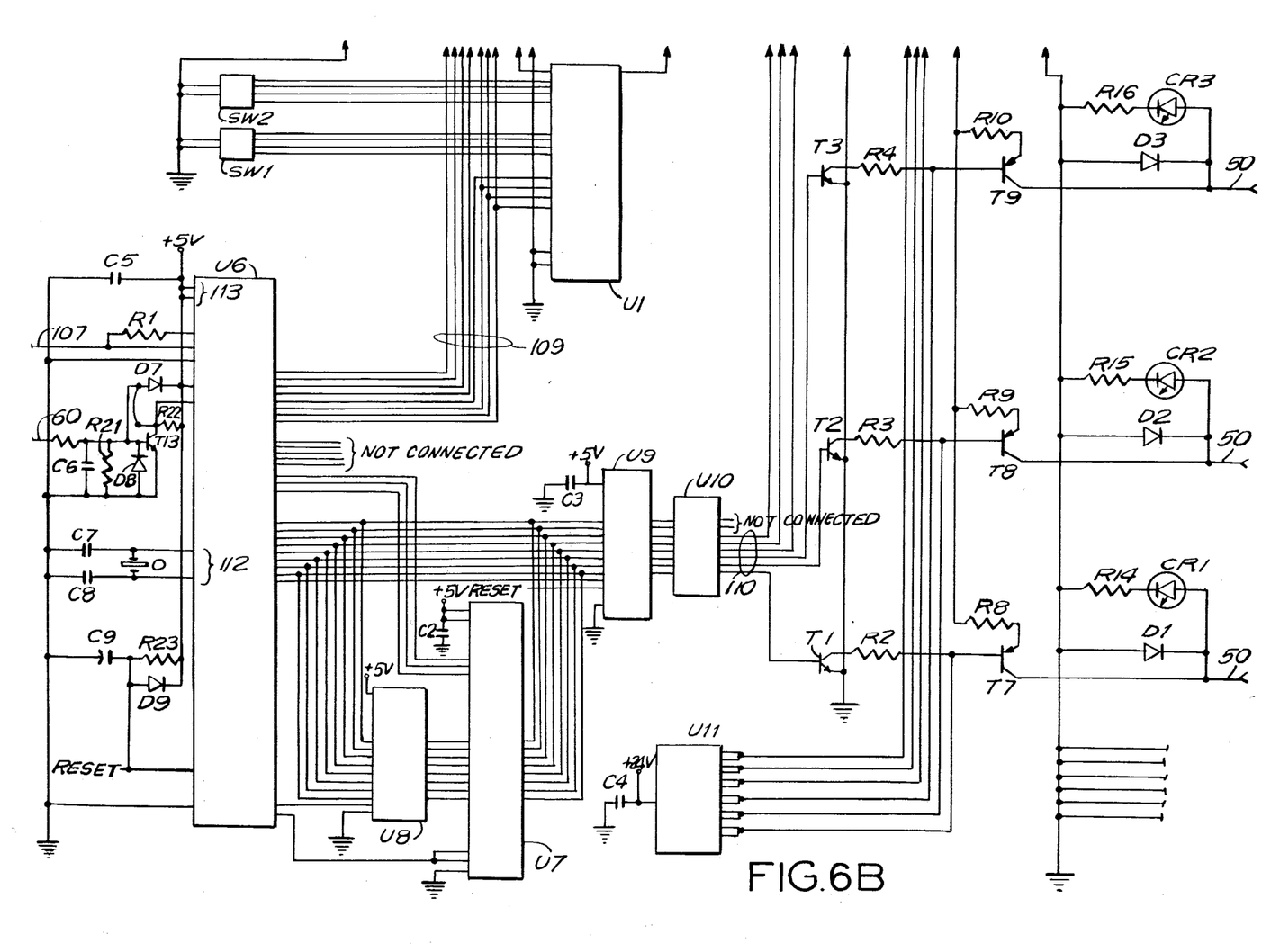

One suitable electronic control unit 51 is shown in block form in FIG. 3. A detailed schematic diagram of the unit shown in FIG. 3 is shown in FIG. 6 and discussed below.

FIG. 3 shows a wash sequence time setting means 103 having manually operated controls such as switches 104 for use by the system's operator in setting the times for the various operations in a wash cycle.

A suitable schedule of settings, for example, is:

| Switch | Function | Time Range/Increment (secs) | Suggested Time (secs) |
|---|---|---|---|
| SW1 | Start Delay | 0–60/4 | 4 |
| SW2 | Pre-Rinse | 0–30/2 | 12–16 |
| SW3 | Pre-Rinse Air Burst | 0–3.75/.25 | 1.5 |
| SW4 | Sanitizer | 0–30/2 | 16–20 |
| SW5 | Sanitizer and Post Rinse Air Burst | 0–3.75/.25 | 1.5 |
| SW6 | Sanitizer Contact Delay ("Soak" Time) | 0–60/4 | 30 (min) |
| SW7 | Post Rinse | 0–30/2 | 12–16 |
| SW8 | Air Dry | 0–30/2 | 16–20 |
| SW9 | Auxiliary Wash | 0–30/2 | 2–4 |
| SW10 | Not used (Reserved for possible additional function) | | |

The time setting means 103 produces output signals indicative of the times set by the operator. These outputs are selectably connected to the time input of a logic control means 105 through lines 106 and 107 and a selectable connection means 108. A gate switch 54, operated by an animal leaving the milking stall, is also shown connected by a line 60 to logic control means 105. The input of gate switch 54 to logic control means 105 causes the logic control means to begin a wash sequence. Once a gate signal input is received, the logic control means produces an output on line 109 which is connected to an input of the selectable connection means 108. As a result of this output, the selectable connection means 108 connects the output signal from the time setting means 103 for the first sequence in the wash cycle. Preferably, the first sequence is a delay time of 4–60 seconds to allow the operator to prevent normal continuation of the cycle if the gate has been improperly activated. Next, the logic control means 105 produces an output on line 110 which is connected to solenoid control circuit 111. As a result of this output on line 110, the circuit 111 produces an output on line 59 causing solenoid controlled pneumatic valve 58 to operate backflush valve 11. As discussed above, backflush valve 11 shifts line 9 from the milk line 12 to the wash line 14. Following this step, the actual washing sequences begin. Logic control means 105 produces an output on line 109, the appropriate time output signal is connected to the time input, and output signals are produced on line 110 which control the solenoid control circuit 111. Circuit 111 produces an output or sequential outputs in conduit 50 and the appropriate solenoid or solenoids 35, 42, 45, 39 are activated. Under the control of logic means 105, the sequence continues until washing is over. At this time, a signal on line 59 is produced to control valve 58 to return the backflush valve 11 to its milking position.

FIGS. 6A and 6B show control unit 51 schematically. Suitable components for use in the electronic control unit 51 are listed in the table below.

| TABLE OF COMPONENTS | |
|---|---|
| Resistors | |
| R1, R20–R23 | 10k |
| R2–R7 | 1k, ½ watt |
| R8–R13 | .27, 1 watt |
| R14–R19 | 2.2k |

-continued

TABLE OF COMPONENTS

Capacitors

| | |
|---|---|
| C1–C5 | 0.1 uF |
| C6 | .01 uF |
| C7, C8 | 22 pF |
| C9 | 1 uF |

Rotary Switches

| | |
|---|---|
| SW1–SW10 | Alco DRD-16 |

IC Chips

| | | |
|---|---|---|
| U1–U5 | Multiplexers | 4051BCP (Motorola) |
| U6 | Microprocessor | uPD80C35C (NEC) |
| U7 | EPROM | 27C16 |
| U8 | Octal Latch | 74HC373 (Motorola) |
| U9 | Octal Latch | 74HC273 (Motorola) |
| U10 | Resistor Pack | RP 8 × 10k |
| U11 | Resistor Pack | RP 15 × 2.2k |

Transistors

| | |
|---|---|
| T1–T6, T13 | 2N3904 |
| T7–T12 | MJE 2955 (Motorola) |

Diodes

| | |
|---|---|
| D1–D6 | 1N4001 |
| D7–D9 | 1N914 |

Indicator Lights

| | |
|---|---|
| CR1–CR6 | Light emitting diodes |

Oscillator

| | |
|---|---|
| O | 3.579 MHz |

Each of the switches SW1-10, collectively 104 in FIG. 3, produces a 4 bit digital output signal indicative of the time set by the operator. These output signals are connected via a plurality of lines to one of the five multiplexers U1-U5 which comprise the selectable connection means 108 of FIG. 3. Two of the switches SW1-SW10 are connected to each of the multiplexers U1-U5. Each of the multiplexers U1-U5 is also connected to several output lines, collectively referred to as line 109, of the microprocessor U6 which in conjunction with suitable clock and power inputs 112 and 113, external program memory circuitry including the latch U8 and the EPROM U7, and the output latch U9 comprise suitable logic control means 105 (FIG. 3). The program which controls the operation of the microprocessor is stored in the EPROM. The transistors T1-T12 and their associated circuitry comprise one suitable solenoid control circuit 111 (FIG. 3) having several output lines labeled 50 and one output line 59 for controlling system control solenoids as discussed above. Under program control, the microprocessor and the attached circuitry control the outputs on the lines 50 and 59 to carry out the functions.

To explain the sequence of operations, assume that the four milking units 10 are attached to four cows and the cows are being milked. When milking is concluded, through arrangements not a part of this invention, the milk claws are released from the cows and are withdrawn from the milking position. This may occur automatically or be done by hand. The animals then move out of the milking stalls which, in the usual case, are closed by a gate. Operation of the gate causes the gate switch 54 to close and an electrical signal is sent via line 60 to the control unit 51 which starts the backflushing sequence.

When the control unit 51 receives the signal from switch 54, there is an adjustable delay of 4-60 seconds, preferably 4 seconds, after which an electrical signal is produced on line 59 which causes valve 58 to operate, thereby resulting in a pneumatic signal, which is sent via line 52 to the backflushing valves 11. These valves are operated by pneumatic pistons as shown in FIG. 4 and application Ser. No. 538,440, and pressure in line 52 causes the piston in each valve to move the line 9 from its position connecting to milk line 12, 13 to a position connecting to wash line 14.

After a delay of say 5 seconds, an electrical signal is sent from unit 51, via conduit 50, to manifold valve 17 to energize solenoid valve 35, which in turn furnishes high pressure air to valve 33 causing said valve to open, releasing water to line 8 whence it flows via lines 14, valves 11 and lines 9 to the milk claws 10, as a prerinse. Every four seconds after solenoid valve 35 is activated, a signal of 0.25-3.75 seconds duration is sent from unit 51 through conduit 50 and line 48 to solenoid activated valve 45, causing valve 43 to be activated and releasing a burst of low pressure air from line 30 into line 8, causing turbulence in the water being delivered to the milking unit and promoting the cleaning action.

After a prerinse period of say 5-30 seconds a second signal from unit 51 causes solenoid control valve 35 to close, closing valve 33 and stopping the flow of water. At the same time activation of solenoid valve 45, to generate air bursts, ceases.

After a delay of say 5 seconds, a signal from unit 51 through conduit 50 and line 47 activates solenoid operated valve 42, which in turn operates valve 40, releasing sanitizing fluid from line 21 into the line 8. Again, every four seconds after valve 42 is activated, an air burst is provided via valves 45 and 43 to assist the cleaning action. After a period of say 4 to 30 seconds, a second signal from unit 51 to valve 42 causes valve 40 to close. Simultaneously air bursts are halted.

After the contact delay of say 4 to 60 seconds, another signal from unit 51 activates valves 35 and 33, releasing water into line 8 for a postrinse. Again, air bursts every four seconds are provided from line 30.

The post-rinse lasts say 4-30 seconds, following which valves 35 and 33 are closed and the air bursts are terminated. A signal is then sent from unit 51 to valve 45, causing valve 43 to open, releasing a continuous stream of low pressure air into line 8 to dry the apparatus. After a period of say 4-30 seconds valves 43 and 45 are closed by a signal from unit 51.

Immediately after the backflush valve has moved line 9 into connection with line 12, a signal is sent from unit 51 to valve 39 causing it and valve 37 to open, releasing water into line 7 where it is connected to a nozzle 65 (FIG. 4) in the backflush valves 11 to spray the interior of the housings of those valves. After a period of say 4-30 seconds valves 39 and 37 are closed on another signal from unit 51.

The wash cycle having been completed, after the deactivation of valve 35, the control unit 51 changes its output on line 59, the solenoid controlling valve 58, high pressure is deenergized and air is furnished via line 53 to the backflush valve causing it to move line 9 from connection to line 14 to connection with line 12 in preparation for another milking sequence.

What is claimed is:

1. A backflush washing system for milking machines having a milking unit for delivering milk from an animal being milked to a milk line, comprising a backflush valve for alternatively connecting the milking unit to the milk line and to a wash line, a source of sanitizing liquid, a source of water, a source of low pressure air, a source of high pressure air, a manifold valve for separately and individually connecting said source of low pressure air, said source of water and said source of sanitizing liquid to said wash line at predetermined intervals and means connected to said source of high pressure air, for operating said manifold valve.

2. A backflush system for milking machines having a plurality of milking units for concurrently delivering milk from a plurality of animals being milked to a milk line, comprising a backflush valve for each milking unit for alternatively connecting each milking unit to the milk line or to a wash line, a source of sanitizing liquid, a source of water, a source of low pressure air, a source of high pressure air, a manifold valve for separately and individually connecting said source of low pressure air, said source of water and said source of sanitizing liquid to said wash line at predetermined intervals, means connected to said source of high pressure air for operating said manifold valve and means for delivering bursts of low pressure air to said wash line, intermittently, during the intervals when said source of water or source of sanitizing liquid are also connected to said wash line.

3. The system claimed in claims 1 or 2 and comprising means for connecting said source of low pressure air to said wash line intermittently during the intervals when said source of water and said source of sanitizing liquid are also connected to said wash line.

4. The system claimed in claims 1 or 2 and comprising means, connected to said source of high pressure air for operating said backflushing valve.

5. The system claimed in claims 1 or 2 and comprising means for adjusting the intervals during which said source of water, source of sanitizing liquid and source of low pressure air are connected to said wash line.

6. The system claimed in claims 1 or 2 and comprising means for flushing said backflush valves after said milking unit has been washed.

7. The backflush system for a milking machine having a milking unit delivering milk from animals being milked to a milk line, comprising a backflush valve, for alternately connecting the milking unit to the milking line and to a wash line, means for delivering, individually, during preselected periods over a predetermined interval, water, sanitizing fluid and air to said wash line and thence to said backflush valve when said backflush valve is connected to said wash line and means for flushing said backflush valve with water at the end of said predetermined interval.

8. The system claimed in claim 7 and comprising a plurality of milking units, there being a backflush valve for each unit.

9. The system claimed in claim 7 and comprising means for delivering bursts of air to said wash line during the intervals when water and when sanitizing liquid are delivered to said wash line.

* * * * *

UNITED STATES PATENT AND TRADEMARK OFFICE
CERTIFICATE OF CORRECTION

PATENT NO. : 4,572,105
DATED : February 25, 1986
INVENTOR(S) : Mofazzal H. Chowdhury & Michael W. Ellis It is certified that error appears in the above—identified patent and that said Letters Patent is hereby corrected as shown below:

Col. 1, line 8, change "sensitize" to --sanitize--;

Col. 8, line 8, change "The" to --A--.

Signed and Sealed this

Second Day of December, 1986

*Attest:*

DONALD J. QUIGG

*Attesting Officer*  *Commissioner of Patents and Trademarks*